United States Patent [19]

Kumesawa

[11] Patent Number: 5,495,289
[45] Date of Patent: Feb. 27, 1996

[54] FIT SOLID STATE IMAGE SENSOR WITH FLICKER SUPPRESSION

[75] Inventor: Tetsuro Kumesawa, Kanagawa, Japan

[73] Assignee: Sony Corporation, Tokyo, Japan

[21] Appl. No.: 369,257

[22] Filed: Jan. 5, 1995

Related U.S. Application Data

[63] Continuation of Ser. No. 86,100, Jul. 6, 1993, abandoned.

[30] Foreign Application Priority Data

Jul. 31, 1992 [JP] Japan ................................. 4-225033

[51] Int. Cl.⁶ .................................................. H04N 5/335
[52] U.S. Cl. ........................ 348/320; 348/322; 348/241
[58] Field of Search .................................. 348/320, 321, 348/322, 324, 323, 311, 316, 317, 226, 241; H04N 5/335

[56] References Cited

U.S. PATENT DOCUMENTS

| | | | |
|---|---|---|---|
| 4,658,287 | 4/1987 | Chen | 358/48 |
| 4,831,453 | 5/1989 | Takemura | 358/213.19 |
| 4,851,917 | 7/1989 | Ohzu | 358/213.22 |
| 4,862,487 | 8/1989 | Ando et al. | 358/213.19 |
| 4,866,528 | 9/1989 | Yamazaki et al. | 548/322 |
| 5,181,101 | 1/1993 | Opa | 348/320 |
| 5,298,734 | 3/1994 | Kukubo | 348/322 |

Primary Examiner—Joseph Mancuso
Assistant Examiner—Tuan V. Ho
Attorney, Agent, or Firm—Ronald P. Kananen

[57] ABSTRACT

An FIT solid state image sensor including an image section having an array of photosensitive elements, a storage section for temporarily storing signal charges transferred thereto from the image section, a plurality of vertical shift registers provided for respective vertical lines of the array, and a horizontal shift register for horizontally transferring the signal charges transferred vertically through the vertical shift registers. Clock pulses are applied to the vertical transfer registers during a line shift transfer period of transferring the signal charges from the storage section to the horizontal shift register. The voltage levels of the clock pulses are set to provide the same potential between the photosensitive elements arranged in odd horizontal lines of the array and the photosensitive elements arranged in even horizontal line of the array.

16 Claims, 6 Drawing Sheets

VSO = VSE

| SOURCE | CLOCK PULSES | | | | LINE SHIFT TRANSFER PERIOD |
|---|---|---|---|---|---|
| | ØIm1 | ØIm2 | ØIm3 | ØIm4 | |
| FIG. 4 | H | L | H | L | $T_{11}$ OR $T_{12}$ |
| p7, l.22 TO l.25 | L | H | L | H | $T_{11}$ OR $T_{12}$ |
| p6, l.28 TO p7 l.16 | H | L | H | L | $< T_{11}$; $< T_{12}$ |
| " | L | H | L | H | $< T_{11}$; $< T_{12}$ |
| p7, l.26 - l.29 | CONSTANT H NO CLOCK PULSE | CONSTANT L | CONSTANT H | CONSTANT L | $T_{11}, T_{12}$ |
| p7, l.30 - l.33 | CONSTANT L NO CLOCK PULSE | CONSTANT H | CONSTANT L | CONSTANT H | $T_{11}, T_{12}$ |
| FIG. 5 | H NO CLOCK PULSE | H | H | H | |
| FIG. 5 | L NO CLOCK PULSE | L | L | L | |

FIT SOLID STATE IMAGE SENSOR WITH FLICKER SUPPRESSION

This application is a continuation of application Ser. No. 08/086,100 filed Jul. 6, 1993, now abandoned.

BACKGROUND OF THE INVENTION

This invention relates to a frame interline transfer (FIT) solid state image sensor of the type having an array of photosensitive elements for storing signal charges.

Solid state image sensors, such as charge coupled device (CCD) image sensors, employ an array of photosensitive elements for storing signal charges induced when exposed to light. The signal charges are transferred from the photosensitive elements to vertical shift registers provided for the photosensitive elements arranged in the respective vertical lines of the array. Clock pulses are applied in one direction to transfer the signal charges from the vertical shift registers for conversion into a video signal. Similar clock pulses are applied in the opposite direction to sweep the residual charges from the vertical shift registers before the next cycle of the signal charge transferring operation. It is preferable to improve the vertical resolving power by storing and reading one frame of signal charges rather than one field of signal charges during each cycle of signal charge transferring operation. One serious problem associated with such an image sensor is the tendency toward flicker noises which occur in a dark condition with no light incident on the photosensitive elements.

SUMMARY OF THE INVENTION

It is a main object of the invention to provide an improved FIT solid state image sensor which is free from flicker noises.

Another object of the invention is to provide an improved FIT solid state image sensor which consumes less power.

Still another object of the invention is to provide an improved FIT solid state image sensor which can prevent a pseudo smear signal from being produced.

There is provided, in accordance with the invention, an FIT solid state image sensor including an image section having an array of photosensitive elements, a storage section for temporarily storing signal charges transferred thereto from the image section, a plurality of vertical shift registers provided for respective vertical lines of the array, and a horizontal shift register for horizontally transferring the signal charges transferred vertically through the vertical shift registers. The image sensor comprises means for applying clock pulses to the vertical transfer registers during a line shift transfer period of transferring the signal charges from the storage section to the horizontal shift register, and means for setting the clock pulses at voltage levels to provide the same potential between the photosensitive elements arranged in odd horizontal lines of the array and the photosensitive elements arranged in even horizontal lines of the array.

BRIEF DESCRIPTION OF THE DRAWINGS

The invention will be described in greater detail by reference to the following description taken in connection with the accompanying drawings, in which.

DETAILED DESCRIPTION OF THE INVENTION

Figure 1:
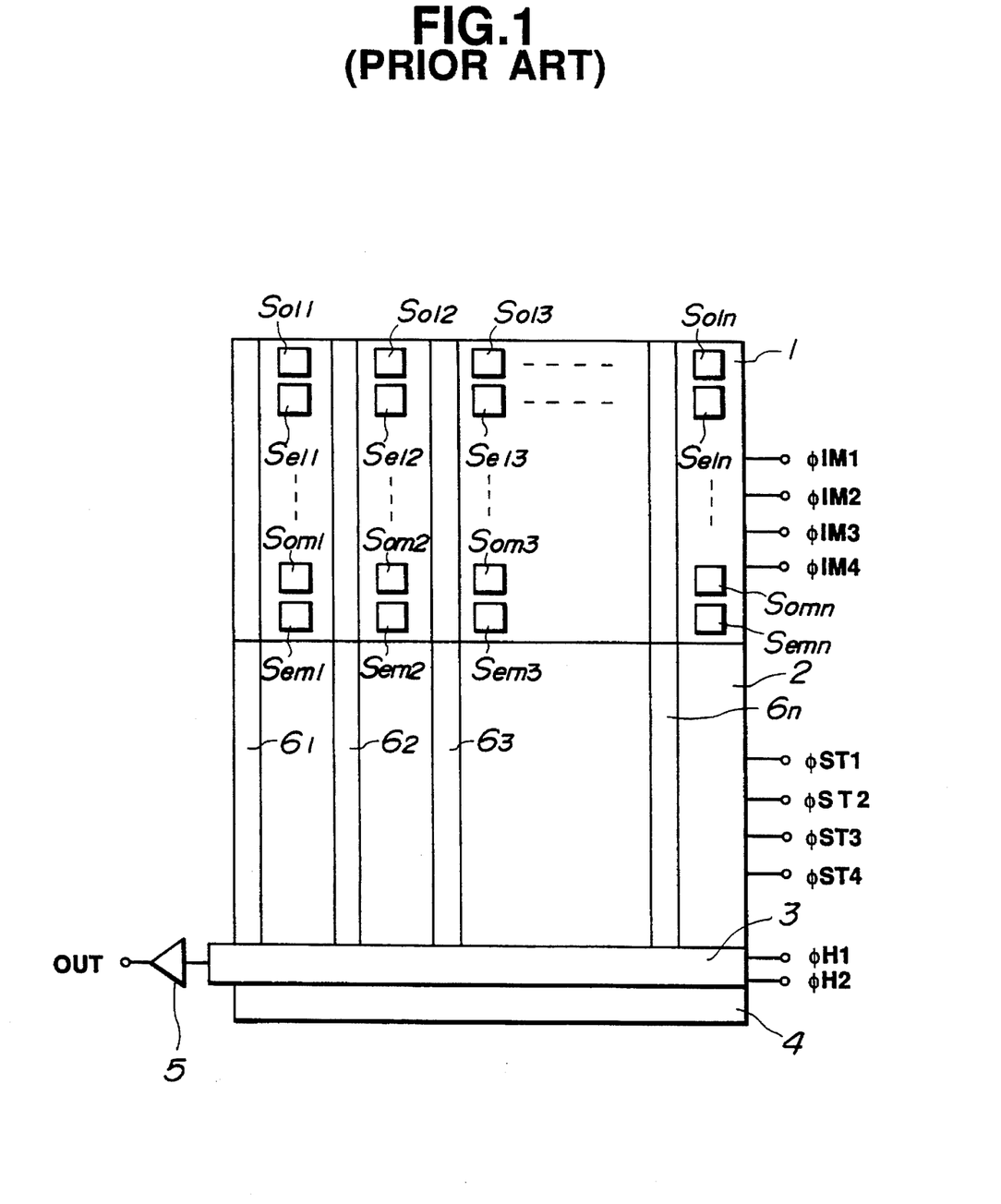
FIG. 1 is a schematic diagram showing a prior art FIT solid state image sensor.

Prior to the description of the preferred embodiments of the invention, the prior art FIT type solid state image sensor of FIG. 1 is briefly described in order to provide a basis for a better understanding of the difficulties attendant thereon.

Referring to FIG. 1, there is illustrated a frame interline transfer (FIT) type CCD image sensor including an image section 1, a storage section 2, a horizontal shift register 3, a smear drain section 4 and a signal charge detecting section 5. The image section 1 has an array of photosensitive elements. The photosensitive elements are classified into n groups ($S_{o11} \ldots S_{em1}$, $S_{o12} \ldots S_{em2}$, $S_{o13} \ldots S_{em3}$, ... and $S_{o1n} \ldots S_{emn}$) including photosensitive elements arranged in n vertical lines of the array. The photosensitive element groups in the image section 1 are associated with respective vertical shift registers $6_1$, $6_2$, $6_3$, ... and $6_n$. The vertical Shift registers $6_1$, $6_2$, $6_3$, ... $6_n$ extend through the charge storage section 2 to the horizontal shift register 3. The charge storage section 2 temporarily stores one frame of signal charges transferred thereto from the vertical shift registers $6_1$, $6_2$, $6_3$, ... and $6_n$. The horizontal shift register 3 receives one line of signal charges transferred thereto from the charge storage section 2 at uniform intervals of time. The horizontal shift register 3 is connected to the signal charge detecting section 5 which converts the signal charges transferred thereto into a video signal (voltage signal). The vertical shift registers are driven in the image section 1 by four phase clock pulses $\Phi IM1$, $\Phi IM2$, $\Phi IM3$ and $\Phi IM4$ and in the storage section 2 by four phase clock pulses $\Phi ST1$, $\Phi ST2$, $\Phi ST3$ and $\Phi ST4$ different from the clock pulses $\Phi IM1$, $\Phi IM2$, $\Phi IM3$ and $\Phi IM4$. The horizontal shift register 3 is driven by two phase clock pulses $\Phi H1$ and $\Phi H2$.

Figure 2:
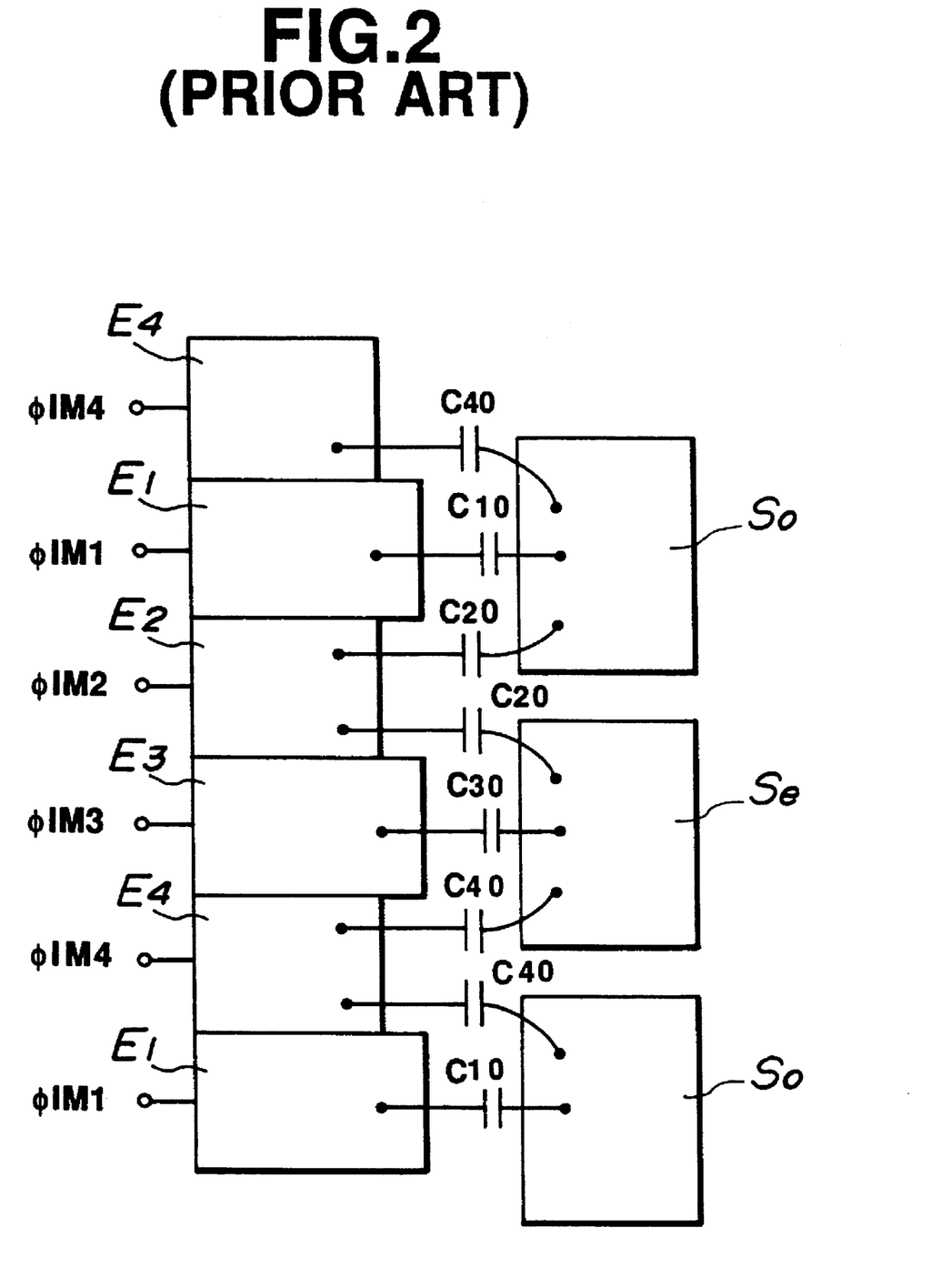
FIG. 2 is a schematic diagram showing a transfer electrode arrangement used with the prior art FIT solid state image sensor of FIG. 1.

Referring to FIG. 2, each of the vertical shift registers $6_1$, $6_2$, $6_3$, ... $6_n$ has a pair of transfer electrodes $E_1$ and $E_2$ or $E_3$ and $E_4$ for one of the photosensitive elements arranged in a vertical line of the array. Adjacent four transfer electrodes $E_1$, $E_2$, $E_3$ and $E_4$ constitute One stage. Four phase clock pulses $\Phi IM1$, $\Phi IM2$, $\Phi IM3$ and $\Phi IM4$ are applied to the four transfer electrodes $E_1$, $E_2$, $E_3$ and $E_4$ in an order of transferring signal charges. The photosensitive elements $S_o$ arranged in the odd horizontal lines of the array are coupled electrostatically with the transfer electrodes $E_{34}$, $E_1$ and $E_2$. The photosensitive elements $S_e$ arranged in the even horizontal lines of the array are coupled electrostatically with the transfer electrodes $E_2$, $E_3$ and $E_4$.

Figure 3:
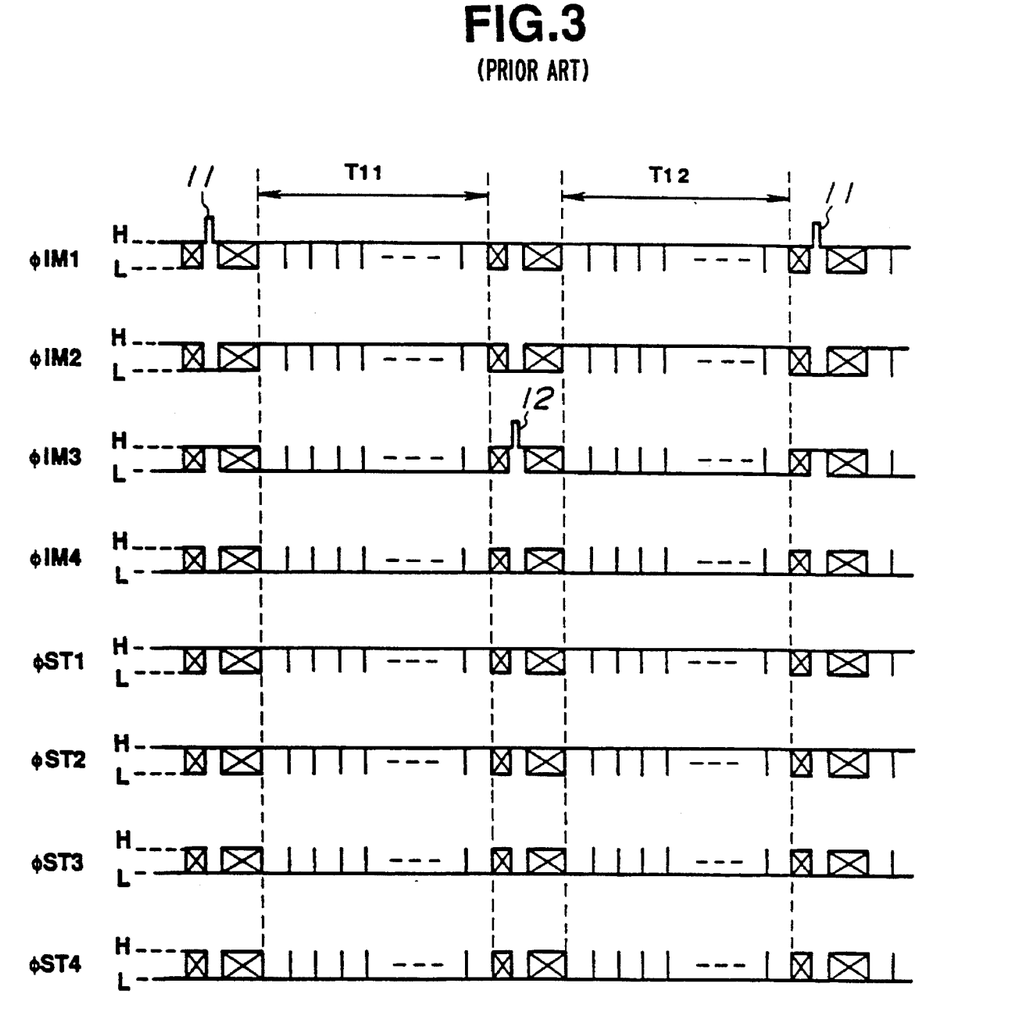
FIG. 3 is a time chart used in explaining the operation of the prior art FIT solid state image sensor of FIG. 1.

Referring to FIG. 3, the operation of the prior art FIT solid state image sensor will be described. After the photosensitive-elements $S_o$ and $S_e$ arranged in the odd and even horizontal lines of the array are reset by reading pulses 11 and 12, they float electrically and have fluctuating potentials because of the electrostatic coupling with the clock pulses ΦIM1, ΦIM2, ΦIM3 and ΦIM4 applied to the respective transfer electrodes $E_1$, $E_2$, $E_3$ and $E_4$. This results in a potential difference between the photosensitive elements $S_o$ arranged on the odd horizontal lines of the array and the photosensitive elements $S_e$ arranged on the even horizontal lines of the array during a line shift transfer period $T_{11}$ or $T_{12}$ while they are set at the same potential just after a reading pulse 11 or 12 is produced. This is mainly stemmed from the fact that the clock pulses ΦIM1, ΦIM2, ΦIM3 and ΦIM4 have different voltage levels after the reading pulse 11 or 12 occurs. In greater detail, during the line shift transfer period $T_{11}$ or $T_{12}$, the clock pulses ΦIM1 and ΦIM2 have a normally "H (high)" level, whereas the clock pulses ΦIM3 and ΦIM4 have a normally "L (low)" level. Since the potential of the photosensitive elements $S_o$ arranged in the odd horizontal lines of the array is greater than the potential of the photosensitive elements $S_e$ arranged in the even horizontal lines of the array, a charge quantity difference occurs between the photosensitive elements $S_o$ and $S_e$ to introduce flicker noises in a dark condition with no light incident on the image section 1.

According to this invention, the times at which the vertical transfer registers $6_1$, $6_2$, $6_3$ and $6_4$ are driven in the image section 1 are controlled to prevent flicker noises in a dark condition with no light incident on the image section 1.

Figure 4:
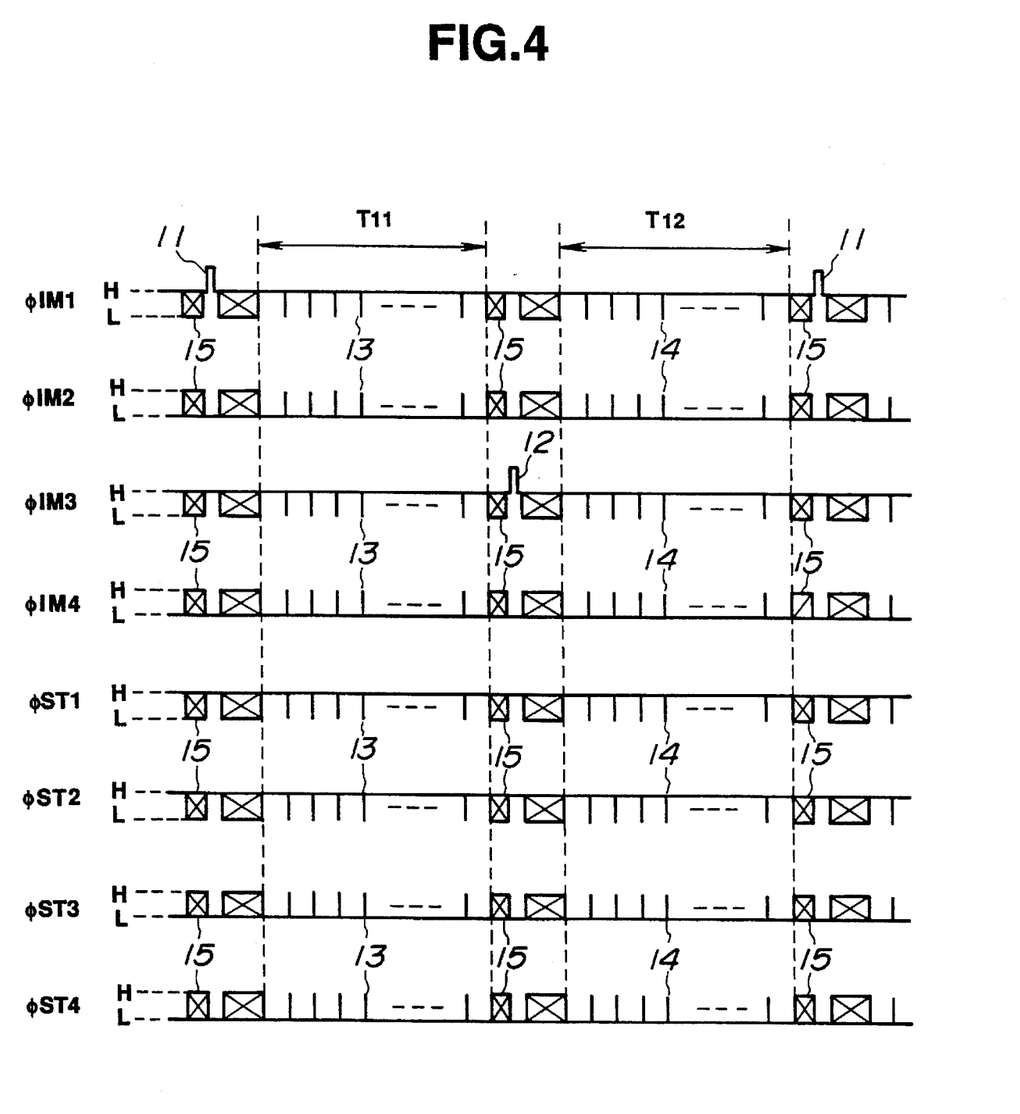
FIG. 4 is a time chart used in explaining the operation of one embodiment of an FIT solid state image sensor made in accordance with the invention.

Description will be made to one embodiment of an FIT solid state image sensor made in accordance with the invention with reference to FIG. 4 where the numerals 11 and 12 indicate reading pulses used to read signal charges out of the photosensitive elements $S_o$ and $S_e$ to the vertical shift registers $6_1$, $6_2$, $6_3$, $6_4$, . . . $6_n$, the numerals 13 and 14 indicate clock pulses used for vertical transfer of signal charges, and the numeral 15 indicate smear charge sweeping pulses for sweeping smear charges stored in the vertical shift registers $6_1$, $6_2$, $6_3$, $6_4$, . . . $6_n$ of the image section 1. In this embodiment, the clock pulses ΦIM1 and ΦIM3 are set at a normally "H" level and the clock pulses ΦIM2 and ΦIM4 are set at a normally "L" level during a line shift transfer period $T_{11}$ or $T_{12}$, as shown in FIG. 4. That is, the voltage levels of the clock pulses applied to the vertical shift registers $6_1$, $6_2$, $6_3$, $6_4$, . . . and $6_n$ during a line shift transfer period are set in such a manner that the photosensitive elements $S_o$ arranged in the odd horizontal lines of the array have the same potential as the photosensitive elements $S_e$ arranged in the even horizontal lines of the array. Since the signal charge storage can be started with the photosensitive elements $S_o$ arranged in the odd horizontal lines of the array and the photosensitive elements $S_e$ arranged in the even horizontal lines of the array having the same potential over the entire line shift transfer period $T_{11}$ or $T_{12}$, it is possible to prevent flicker noises in a dark condition with no light incident on the image section 1.

While this embodiment has been described in connection with the case where the clock pulses ΦIM1 and ΦIM3 are held at the normally "H" level and the clock pulses ΦIM2 and ΦIM4 are held at the normally "L" level over the entire line shift transfer period $T_{11}$ or $T_{12}$, it is to be understood that the invention is not limited in any way to this case. The period during which the clock pulses ΦIM1 and ΦIM3 are held at the normally "H" level and the clock pulses ΦIM2 and ΦIM4 are held at the normally "L" level may be a part of the entire line shift transfer period. The times at which the four phase clock pulses ΦST1, ΦST2, ΦST3 and ΦST4 are applied are not limited to the case shown in FIG. 4 and they may be set freely as long as the signal charges can be transferred in a normal manner. Although this embodiment has been described in connection with four phase drive type vertical shift registers $6_1$, $6_2$, $6_3$, $6_4$, . . . and $6_n$, it is to be understood that the invention is equally applicable to FIT solid state image sensors which employ two phase drive or three phase drive type vertical shift registers.

Although this embodiment has been described in connection with clock pulses ΦIM1 and ΦIM3 set at a normally "H" level and clock pulses ΦIM2 and ΦIM4 set at a normally "L" level, it is to be understood that the same effect can be obtained by the following three types of vertical shift register drive timing:

(1) the clock pulses ΦIM1 and ΦIM3 set at a normally "L" level and the clock pulses ΦIM2 and ΦIM4 set at a normally "H" level over the entire line shift transfer periods $T_{11}$ and $T_{12}$.

(2) the clock pulses ΦIM1 and ΦIM3 held at a constant "H" level and the clock pulses ΦIM2 and ΦIM4 held at a constant "L" level over the entire line shift transfer periods $T_{11}$ and $T_{12}$.

(3) the clock pulses ΦIM1 and ΦIM3 held at a constant "L" level and the clock pulses ΦIM2 and ΦIM4 held at a constant "H" level over the entire line shift transfer periods $T_{11}$ and $T_{12}$.

By these three types of vertical shift register drive timing, the voltage levels of the four phase clock pulses ΦIM1, ΦIM2, ΦIM3 and ΦIM4 can be set in such a manner that the photosensitive elements $S_o$ arranged in the odd horizontal lines of the array and the photosensitive elements $S_e$ arranged in the even horizontal lines of the array have the same potential during the line shift transfer periods $T_{11}$ and $T_{12}$. It is, therefore, possible to prevent flicker noises in a dark condition with no light incident on the image section 1. If the clock pulses ΦIM1 and ΦIM3 are held at a constant "H" level and the clock pulses ΦIM2 and ΦIM4 are held at a constant "L" level over the entire line shift transfer periods $T_{11}$ and $T_{12}$ or if the clock pulses ΦIM1 and ΦIM3 are held at a constant "L" level and the clock pulses ΦIM2 and ΦIM4 are held at a constant "H" level over the entire line shift transfer periods $T_{11}$ and $T_{12}$, no clock pulses 13 and 14 (FIG. 4) will be produced so that no line shift transfer is made in the image section 1. This is effective to save power consumption.

Figure 5:
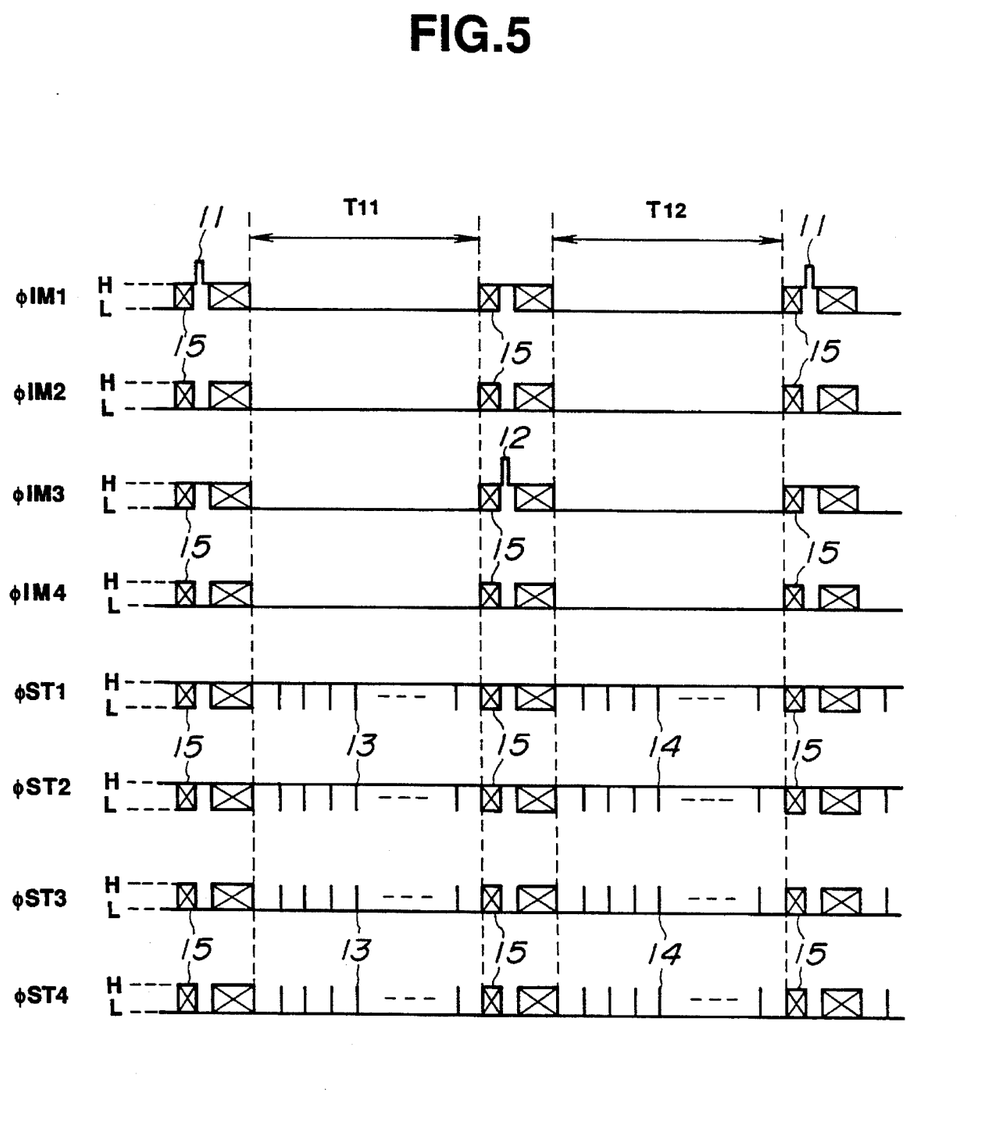
FIG. 5 is a time chart used in explaining the operation of a second embodiment of the FIT solid state image sensor of the invention.
Figure 6:
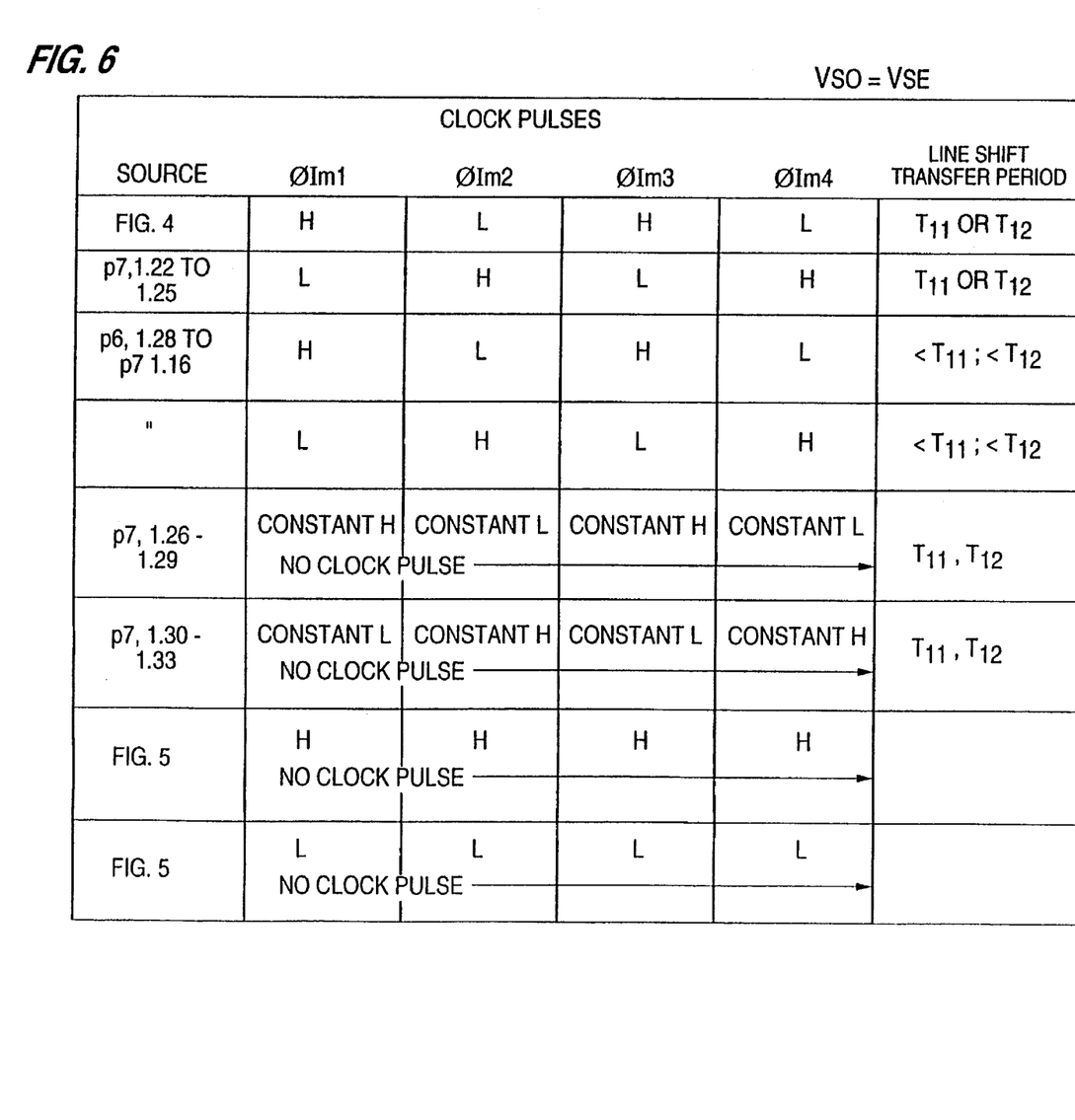
FIG. 6 is a chart showing alternative arrangements for the clock pulses and the line transfer period to achieve the aims of the invention.

Description will be made to a second embodiment of the FIT solid state image sensor of the invention with reference to FIG. 5. In this embodiment, all of the clock pulses ΦIMI, ΦIM2, ΦIM3 and ΦIM4 applied to the vertical shift registers $6_1$, $6_2$, $6_3$, $6_4$, . . . $6_n$ during the line shift transfer periods $T_{11}$ and $T_{12}$ are set at an "L" level, as shown in FIG. 5. As a result, the signal charges are stored during line shift transfer periods $T_{11}$ and $T_{12}$ with the photosensitive elements $S_o$ arranged in the odd horizontal lines of the array having the same potential as the photosensitive elements $S_e$ arranged in the even horizontal lines of the array. It is, therefore, possible to prevent flicker noises in a dark condition with no light incident on the image section 1, as described in connection with the first embodiment of the invention. Since all of the four phase clock pulses ΦIM1, ΦIM2, ΦIM3 and ΦIM4 have an "L" level during the line shift transfer periods $T_{11}$ and $T_{12}$ so that no clock pulses 13 and 14 (FIG. 5) will be produced so that no line shift transfer is made in the image section 1. This is effective to save power consumption.

Since all of the four phase clock pulses ΦIM1, ΦIM2, ΦIM3 and ΦIM4 are set at the same voltage level during the line shift transfer period $T_{11}$ and $T_{12}$, the vertical shift registers $6_1, 6_2, 6_3, 6_4, \ldots 6_n$ are held at the same channel potential. This is effective to sweep the smear charges produced in the vertical shift registers $6_1, 6_2, 6_3, 6_4, \ldots$ and $6_n$ in the image section 1 to the respective vertical shift registers $6_1, 6_2, 6_3, 6_4, \ldots$ and $6_n$ in the storage section 2. Since the quantity of the smear charges remaining in the vertical shift registers $6_1, 6_2, 6_3, 6_4, \ldots$ and $6_n$ are very small, the smear charge sweeping pulse 15 can sweep almost the whole amount of the remaining smear charges. It is, therefore, possible to eliminate the possibility of a pseudo smear signal which may occur when the smear charges are swept insufficiently.

While this embodiment has been described in connection with the case where all of the clock pulses ΦIM1, ΦIM2, ΦIM3 and ΦIM4 are set at an "L" level during line shift transfer periods $T_{11}$ and $T_{12}$, it is to be understood that the same result can be obtained when all of the clock pulses ΦIM1, ΦIM2, ΦIM3 and ΦIM4 are set at an "H" level.

What is claimed is:

1. An FIT solid state image sensor, comprising:

an image section having an array of photosensitive elements for generating signal charges corresponding to an optical image;

a storage section for temporarily storing the signal charges transferred from the image section;

a plurality of vertical shift registers provided for respective vertical lines of the array for vertically transferring the signal charges from the image section through the storage section;

a horizontal shift register for horizontally transferring the signal charges transferred vertically through the image and storage sections by the vertical shift registers; and means for applying clock pulses to the vertical shift registers during a line shift transfer period for transferring the signal charges from the image section, through the storage section, and to the horizontal shift register;

wherein said applying means applies said clock pulses to said transfer electrodes of said vertical shift registers in said image section such that the photosensitive elements arranged in odd horizontal lines of the array receive a potential from said vertical shift registers which is equal to a potential received by the photosensitive elements arranged in even horizontal lines of the array from said vertical shift registers;

whereby the vertical shift registers of the image section are controlled to prevent flicker when no light is incident on the image section.

2. The FIT solid state image sensor as claimed in claim 1, wherein each of the vertical shift registers has a pair of transfer electrodes for one of the photosensitive elements arranged in a vertical line of the array, adjacent four transfer electrodes constituting one stage, four phase clock pulses ΦIM1, ΦIM2, ΦIM3, and ΦIM4 being applied to the four transfer electrodes in a sequence of transferring signal charges so as to read one frame of signal charges.

3. The FIT solid state image sensor as claimed in claim 2, wherein the clock pulses ΦIM1 and ΦIM3 and the clock pulses ΦIM2 and ΦIM4 are set at a high voltage level and a low voltage level respectively, before the clock pulses rise.

4. The FIT solid state image sensor as claimed in claim 2, wherein the clock pulses ΦIM1 and ΦIM3 and the clock pulses ΦIM2 and ΦIM4 are set at a low voltage level and a high voltage level respectively before the clock pulses rise.

5. The FIT solid state image sensor as claimed in claim 2, wherein the clock pulses ΦIM1 and ΦIM3 are held at a constant high voltage level and the clock pulses ΦIM2 and ΦIM4 are held at a constant low voltage level during the line shift transfer period.

6. The FIT solid state image sensor as claimed in claim 2, wherein the clock pulses ΦIM1 and ΦIM3 are held at a constant low voltage level and the clock pulses ΦIM2 and ΦIM4 are held at a constant high voltage level during the line shift transfer period.

7. An FIT solid state image sensor, comprising:

an image section having an array of photosensitive elements for generating signal charges corresponding to an optical image;

a storage section for temporarily storing the signal charges transferred from the image section;

a plurality of vertical shift registers provided for respective vertical lines of the array for vertically transferring the signal charges from the image section through the storage section;

a horizontal shift register for horizontally transferring the signal charges transferred vertically through the image and storage sections by the vertical shift registers; and means for applying clock pulses to the vertical shift registers during a line shift transfer period for transferring the signal charges from the image section, through the storage section, and to the horizontal shift register;

wherein said applying means applies said clock pulses to said transfer electrodes of said vertical shift registers in said image section such that the photosensitive elements arranged in odd horizontal lines of the array receive a potential from said vertical shift registers which is equal to a potential received by the photosensitive elements arranged in even horizontal lines of the array from said vertical shift registers;

whereby the vertical shift registers of the image section are controlled to prevent flicker when no light is incident on the image section;

wherein each of the vertical shift registers has a pair of transfer electrodes for one of the photosensitive elements arranged in a vertical line of the array, adjacent four transfer electrodes constituting one stage, four phase clock pulses ΦIM1, ΦIM2, ΦIM3, and ΦIM4 being applied to the four transfer electrodes in a sequence of transferring signal charges so as to read one frame of signal charges; and wherein all of the four phase clock pulses ΦIM1, ΦIM2, ΦIM3 and ΦIM4 are held at a constant low voltage level during the line shift transfer period.

8. An FIT solid state image sensor, comprising:

an image section having an array of photosensitive elements for generating signal charges corresponding to an optical image;

a storage section for temporarily storing the signal charges transferred from the image section;

a plurality of vertical shift registers provided for respective vertical lines of the array for vertically transferring the signal charges from the image section through the storage section;

a horizontal shift register for horizontally transferring the signal charges transferred vertically through the image and storage sections by the vertical shift registers; and means for applying clock pulses to the vertical shift registers during a line shift transfer period for transferring the signal charges from the image section, through the storage section, and to the horizontal shift register;

wherein said applying means applies said clock pulses to said transfer electrodes of said vertical shift registers in said image section such that the photosensitive elements arranged in odd horizontal lines of the array receive a potential from said vertical shift registers which is equal to a potential received by the photosensitive elements arranged in even horizontal lines of the array from said vertical shift registers;

whereby the vertical shift registers of the image section are controlled to prevent flicker when no light is incident on the image section;

wherein each of the vertical shift registers has a pair of transfer electrodes for one of the photosensitive elements arranged in a vertical line of the array, adjacent four transfer electrodes Constituting one stage, four phase clock pulses ΦIM1, ΦIM2, ΦIM3 and ΦIM4 being applied to the four transfer electrodes in a sequence of transferring signal charges so as to read one frame of signal charges; and wherein all of the four phase clock pulses ΦIM1, ΦIM2, ΦIM3 and ΦIM4 are held at a constant high voltage level during the line shift transfer period.

9. A frame interline transfer (FIT) type CCD image sensor, comprising:

an image section which includes an n×m array of photosensitive elements arranged in m horizontal lines and n vertical lines of the array and associated with respective vertical shift registers driven by a plurality of image section clock pulses, each of the vertical shift registers having a pair of transfer electrodes for each one of the photosensitive elements arranged in a vertical line of the array, said plurality of image section clock pulses being applied to respective pairs of said transfer electrodes for transferring signal changes through said image section;

a charge storage section through which said vertical shift registers extend for temporarily storing signal charges transferred thereto from the image section by the vertical shift registers, said vertical shift registers being driven by a plurality of storage section clock pulses;

a horizontal shift register for receiving signal charges from said charge storage section at uniform intervals and driven by a plurality of horizontal shift register clock pulses;

a signal charge detecting section connected to said horizontal shift register for converting signal charges transferred thereto into a video signal;

wherein said image section clock pulses are set so that during a line shift transfer period the photosensitive elements arranged in the odd horizontal lines of the array receive a potential from said vertical shift registers which is equal to a potential received by the photosensitive elements arranged in the even horizontal lines of the array from the vertical shift registers, thus preventing flicker noises in a dark condition with no light incident on the image section.

10. The FIT solid state image sensor as claimed in claim 9, wherein each of the vertical shift registers has a pair of transfer electrodes for one of the photosensitive elements arranged in a vertical line of the array, adjacent four transfer electrodes constituting one stage, four phase clock pulses ΦIM1, ΦIM2, ΦIM3, and ΦIM4 being applied to the four transfer electrodes in a sequence of transferring signal charges so as to read one frame of signal charges.

11. The FIT solid state image sensor as claimed in claim 10, wherein the clock pulses ΦIM1 and ΦIM3 and the clock pulses ΦIM2 and ΦIM4 are set at a high voltage level and a low voltage level respectively, before the clock pulses rise.

12. The FIT solid state image sensor as claimed in claim 10, wherein the clock pulses ΦIM1 and ΦIM3 and the clock pulses ΦIM2 and ΦIM4 are set at a low voltage level and a high voltage level respectively before the clock pulses rise.

13. The FIT solid state image sensor as claimed in claim 10, wherein the clock pulses ΦIM1 and ΦIM3 are held at a constant high voltage level and the clock pulses ΦIM2 and ΦIM4 are held at a constant low voltage level during the line shift transfer period.

14. The FIT solid state image sensor as claimed in claim 10, wherein the clock pulses ΦIM1 and ΦIM3 are held at a constant low voltage level and the clock pulses ΦIM2 and ΦIM4 are held at a constant high voltage level during the line shift transfer period.

15. A frame interline transfer (FIT) type CCD image sensor comprising:

an image section which includes an n×m array of photosensitive elements arranged in m horizontal lines and n vertical lines of the array and associated with respective vertical shift registers driven by a plurality of image section clock pulses, each of the vertical shift registers having a pair of transfer electrodes for each one of the photosensitive elements arranged in a vertical line of the array, said plurality of image section clock pulses being applied to respective pairs of said transfer electrodes for transferring signal changes through said image section;

a charge storage section, through which said vertical shift registers extend, for temporarily storing signal charges transferred thereto from the image section by the vertical shift registers, said vertical shift registers being driven by a plurality of storage section clock pulses;

a horizontal shift register for receiving signal charges from said charge storage section at uniform intervals and driven by a plurality of horizontal shift register clock pulses;

a signal charge detecting section connected to said horizontal shift register for converting signal charges transferred thereto into a video signal;

wherein said image section clock pulses are set so that during a line shift transfer period the photosensitive elements arranged in the odd horizontal lines of the array receive a potential from said vertical shift registers which is equal to a potential received by the photosensitive elements arranged in the even horizontal lines of the array from the vertical shift registers, thus preventing flicker noises in a dark condition with no light incident on the image section;

wherein each of the vertical shift registers has a pair of transfer electrodes for one of the photosensitive elements arranged in a vertical line of the array, adjacent four transfer electrodes constituting one stage, four phase clock pulses ΦIM1, ΦIM2, ΦIM3 and ΦIM4 being applied to the four transfer electrodes in a sequence of transferring signal charges so as to read one frame of signal charges; and wherein all of the four phase clock pulses ΦIM1, ΦIM2, ΦIM3 and ΦIM4 are held at a constant low voltage level during the line shift transfer period.

16. A frame interline transfer (FIT) type CCD image sensor, comprising:

an image section which includes an n×m array of photosensitive elements arranged in m horizontal lines and n vertical lines of the array and associated with respective vertical shift registers driven by a plurality of image section clock pulses, each of the vertical shift registers having a pair of transfer electrodes for each one of the photosensitive elements arranged in a vertical line of the array, said plurality of image section clock pulses being applied to respective pairs of said transfer electrodes for transferring signal charges through said image section;

a charge storage section, through which said vertical shift registers extend, for temporarily storing signal charges transferred thereto from the image section by the vertical shift registers, said vertical shift registers being driven by a plurality of storage section clock pulses;

a horizontal shift register for receiving signal charges from said charge storage section at uniform intervals and driven by a plurality of horizontal shift register clock pulses;

a signal charge detecting section connected to said horizontal shift register for converting signal charges transferred thereto into a video signal;

wherein said image section clock pulses are set so that during a line shift transfer period the photosensitive elements arranged in the odd horizontal lines of the array receive a potential from said vertical shift registers which is equal to a potential received by the photosensitive elements arranged in the even horizontal lines of the array from the vertical shift registers, thus preventing flicker noises in a dark condition with no light incident on the image section;

wherein each of the vertical shift registers has a pair of transfer electrodes for one of the photosensitive elements arranged in a vertical line of the array, adjacent four transfer electrodes constituting one stage, four phase clock pulses $\Phi IM1$, $\Phi IM2$, $\Phi IM3$ and $\Phi IM4$ being applied to the four transfer electrodes in a sequence of transferring signal charges so as to read one frame of signal charges; and wherein all of the four phase clock pulses $\Phi IM1$, $\Phi IM2$, $\Phi IM3$ and $\Phi IM4$ are held at a constant high voltage level during the line shift transfer period.

* * * * *